United States Patent
Baniqued et al.

(10) Patent No.: US 9,787,632 B2
(45) Date of Patent: Oct. 10, 2017

(54) CENTRALIZED CONFIGURATION WITH DYNAMIC DISTRIBUTED ADDRESS MANAGEMENT

(71) Applicant: Aruba Networks, Inc., Sunnyvale, CA (US)

(72) Inventors: Joseph Garcia Baniqued, San Jose, CA (US); Deepika Dwivedi, San Carlos, CA (US); Santashil PalChaudhuri, West Bengal (IN); Sandeep Unnimadhavan, Bangalore (IN); Brijesh Kumar Yadav, Bangalore (IN); Tilak Kumar Adhya, Bangalore (IN); Rajalakshmi Manoharan, Coimbatore (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/701,005

(22) Filed: Apr. 30, 2015

(65) Prior Publication Data
US 2015/0237002 A1 Aug. 20, 2015

Related U.S. Application Data

(63) Continuation of application No. 13/279,182, filed on Oct. 21, 2011, now Pat. No. 9,137,198.

(51) Int. Cl.
*G06F 21/00* (2013.01)
*H04L 29/12* (2006.01)
*H04L 12/24* (2006.01)

(52) U.S. Cl.
CPC ...... *H04L 61/2007* (2013.01); *H04L 41/0803* (2013.01)

(58) Field of Classification Search
None
See application file for complete search history.

(56) References Cited

U.S. PATENT DOCUMENTS

| | | | | |
|---|---|---|---|---|
| 7,130,899 | B1 * | 10/2006 | Bauer | G06F 11/2025 709/203 |
| 7,197,549 | B1 * | 3/2007 | Salama | H04L 61/2061 709/223 |
| 7,792,058 | B1 | 9/2010 | Yip et al. | |
| 9,137,198 | B2 * | 9/2015 | Baniqued | H04L 41/0803 |

(Continued)

*Primary Examiner* — Maung Lwin
(74) *Attorney, Agent, or Firm* — Hewlett Packard Enterprise Patent Department

(57) ABSTRACT

The present disclosure discloses a network device and/or method for centralized configuration with dynamic distributed address management. The disclosed network device receives, at a first network node, a range of sub network addresses and a specified size for a sub network. The disclosed network device then divides the range of sub network addresses into a plurality of sub-ranges of sub network addresses based on the specified size. Further, the network device allocates the plurality of sub-ranges of sub network addresses to a plurality of sub networks, and transmits an allocated sub-range of sub network addresses to a corresponding sub network at a second network node through an established secure communication channel. Moreover, the network device can retrieve a profile template that includes the range of sub network addresses and the specified size of the sub network; and create a profile based on the profile template.

20 Claims, 8 Drawing Sheets

(56) References Cited

U.S. PATENT DOCUMENTS

| | | |
|---|---|---|
| 2002/0161879 A1 | 10/2002 | Richard |
| 2005/0025129 A1* | 2/2005 | Meier ............... H04L 29/12009 370/352 |
| 2006/0018325 A1 | 1/2006 | Conrad |
| 2007/0076694 A1 | 4/2007 | Iyer et al. |
| 2007/0180077 A1* | 8/2007 | Letca ..................... H04L 43/10 709/223 |
| 2007/0183426 A1 | 8/2007 | Daude et al. |
| 2008/0151906 A1* | 6/2008 | Kolli .................. H04L 12/2856 370/395.31 |
| 2009/0109974 A1 | 4/2009 | Shetty et al. |
| 2009/0187644 A1* | 7/2009 | Shichino ........... H04L 29/12254 709/220 |
| 2009/0187970 A1* | 7/2009 | Mower ................ H04L 67/025 726/3 |
| 2009/0222537 A1* | 9/2009 | Watkins ............ H04L 29/12311 709/221 |
| 2010/0077035 A1* | 3/2010 | Li .......................... H04L 67/02 709/206 |
| 2010/0313262 A1* | 12/2010 | Mehta ................ H04L 63/0823 726/12 |
| 2011/0040968 A1* | 2/2011 | Liu ..................... H04L 12/4675 713/162 |
| 2011/0047413 A1* | 2/2011 | McGill ............... G06F 11/1662 714/15 |
| 2011/0167146 A1* | 7/2011 | Murray ................ G06F 9/5061 709/223 |
| 2011/0238793 A1* | 9/2011 | Bedare .............. H04L 29/12283 709/220 |
| 2012/0278801 A1* | 11/2012 | Nelson ............... G06F 9/45533 718/1 |

* cited by examiner

CENTRALIZED CONFIGURATION WITH DYNAMIC DISTRIBUTED ADDRESS MANAGEMENT

BACKGROUND OF THE INVENTION

The present disclosure relates to resource management and configuration in a wireless digital network. In particular, the present disclosure relates to management and configuration of network devices located in remote network nodes.

Wireless digital networks, such as networks operating under Electrical and Electronics Engineers (IEEE) 802.11 standards, are spreading in their popularity and availability. With such popularity, however, come problems of resource management and configurations. Specifically, in many network settings, network devices in one or more remote offices need to communicate with network devices in a central corporate office. Typically, management and configuration of network devices in remote offices are handled by administrators located in the remote offices. Such configuration of network devices in remote offices normally requires entering a number of commands on the remote network devices and establishing communication links to the corporate network at the central corporate office. Therefore, such remote network device management and configuration process is prone to errors from, e.g., human inputs.

Moreover, the management and configuration process will likely require an administrator to be present physically in the remote offices. In addition to the requirement for the administrator to be present in the remote office, it usually requires another administrator in the central corporate office to configure the corresponding network devices in the central corporate office in order to communicate to the remote network devices at the remote offices. The management and configuration process by the administrator at the central corporate office typically involves manually allocating a pool of Internet Protocol (IP) addresses that will be assigned to the remote network devices in remote offices. These addresses typically need to be reserved for the remote network devices in the remote offices. Furthermore, configuration information of the remote network devices is often stored with the network devices in the central corporate office, and usually needs to be backed up regularly and copied a remote backup location, such that the configuration information can be successfully recovered in the event that a remote network device fails and needs to be replaced and/or reconfigured. Thus, existing remote network management and configuration process requires a lot of human as well as network resources.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
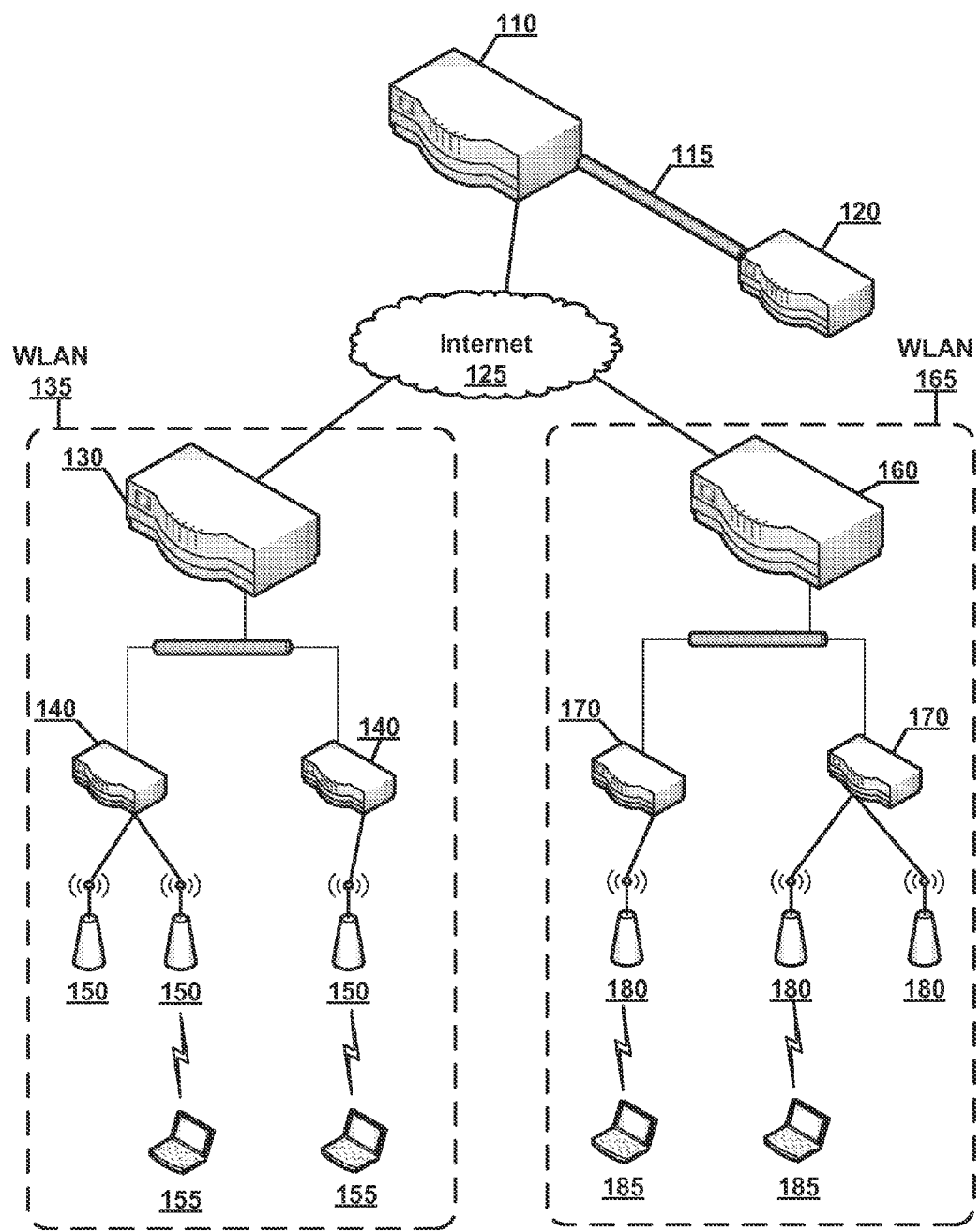
FIG. 1 shows an exemplary wireless digital network environment according to embodiments of the present disclosure.

In the following description, several specific details are presented to provide a thorough understanding. For instance, the term "central network node" may be broadly construed as a first location for network devices (e.g. central corporate office, etc.) while the term "remote network node" may be similarly construed as a second location (e.g. remote office, etc.) that is physically located away from the first location (e.g., tens of meters, miles, etc.). While the context of the disclosure is directed to management and configuration of network devices in a corporate environment, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to resource management and configuration in a wireless digital network and, particularly, to the management and configuration of network devices in remote network nodes. Embodiments of the present disclosure provide a solution that requires little expert intervention to configure and manage the remote network devices. With the solution provided herein, after a remote network device is shipped to a remote network node, the uplink interface needs to be coupled to a public network at the remote network office, and provide basic uplink information and IP address of a corresponding network device at the central node in order to establish a connection to the central node through the corresponding network device. After the remote network device establishes a secure communication channel to the central node via the uplink interface, a configuration for the remote network device with proper IP address allocation is downloaded to the remote network device from the corresponding network device at the central node.

In some embodiments, the network device at the central node maintains a list of remote network nodes which are allowed to connect to it, and also maintains a pool of IP addresses that will be divided among a list of remote network devices at the remote network nodes. Note that remote network node configurations are generated from a profile by one or more network devices at the central network node and stored in the central network node. No local configuration needs to be stored on the remote network device except for the uplink information and the IP address for the corresponding network device at the central network node to which the remote network device communicates. Therefore, embodiments of the present disclosure provide a secured, efficient and easy-to-operate solution for centralized configuration with dynamic distributed address management, which includes central management of dynamic IP address allocation to remote network devices at remote network nodes.

Computing Environment

FIG. 1 shows an exemplary wireless digital network environment according to embodiments of the present disclosure. FIG. 1 includes network devices 110 and 120 which are coupled to each other at a central network node via wired network 115, and wireless local area network (WLAN) 135 and WLAN 165 that are remote network nodes and coupled to network device 110 at the central network node via Internet 125. Specifically, WLAN 135 includes network device 130, which is coupled to both the Internet 125 and network devices 140 in WLAN 135. Each network device 140 can be coupled to one or more access points 150. Each access point 150 can be coupled to one or more client devices 155, which may be mobile or stationary. Likewise, WLAN 165 includes network device 160, which is coupled to both the Internet 125 and network devices 170 in WLAN 165. Each network device 170 can be coupled to one or more access points 180. Each access point 180 can be coupled to one or more client devices 185, where these devices 185 may be stationary or mobile.

In some embodiments, WLAN 135 or 165 can have one or more controllers. In some embodiments, the controllers may include one master controller which communicates to multiple other controllers, each of which communicates with a non-overlapping subset of access points, as well as configures and manages those access points. For example, network device 130 as illustrated in FIG. 1 can be a master controller and can communicate to two other controllers 140. Similarly, network devices in the central network node may also include one or more controllers. The controllers may also include one master controller 110 that communicates to one or more local controllers 120 at the central network node. In some embodiments, a secure communication tunnel, e.g., an Internet Protocol Security (IPsec) tunnel is set up between master controller 110 and local controller 120 to facilitate secured communication.

In some embodiments, master controller may be coupled directly with access points either in remote network nodes or in central network node. In some embodiments, master controller can be combined in part or in entirety with a switch, a router, an edge device, a gateway, an access point, and so on. In some embodiments, a master controller may have a hot standby master controller. In other embodiments, controllers can be virtual controllers rather than physical network devices.

As illustrated in FIG. 1, network devices such as access points 150 and 180 at remote WLANs 135 and 165 can be remotely configured by the network device 110 or 120 at the central network node. Specifically, a remote node specification is generated by a network device at the central network node. The remote node specification specifies how a network device at a remote network node can be configured, provisioned, monitored, and licensed.

In some embodiments, remote network nodes can attempt to connect to the master controller in central network node using a secured communication channel, for example, an Internet Protocol Security (IPsec) tunnel used to connect master controller and local controllers at the central network node, via an uplink interface. Once access point 150 and/or 180 establishes the secured communication channel to the central network node, configuration information corresponding to access points 150 and 180 will be automatically downloaded with proper Internet Protocol (IP) address allocation from the controller at the central network node. The controller at the central network node (also known as "remote node controller") maintains a whitelist of remote network nodes that are allowed to connect to the controller at the central network node. The controller at the central network node can also maintain a pool of IP addresses that will be divided among a list of remote controllers.

In some embodiments, all remote node configuration information is generated from and stored in the controller at central network node. In these embodiments, no local configuration information is stored on the remote network nodes except for the uplink information and the IP address of the controller at the central network node that the remote network nodes communicate with.

Remote Access Points Configuration Management

Figure 2:
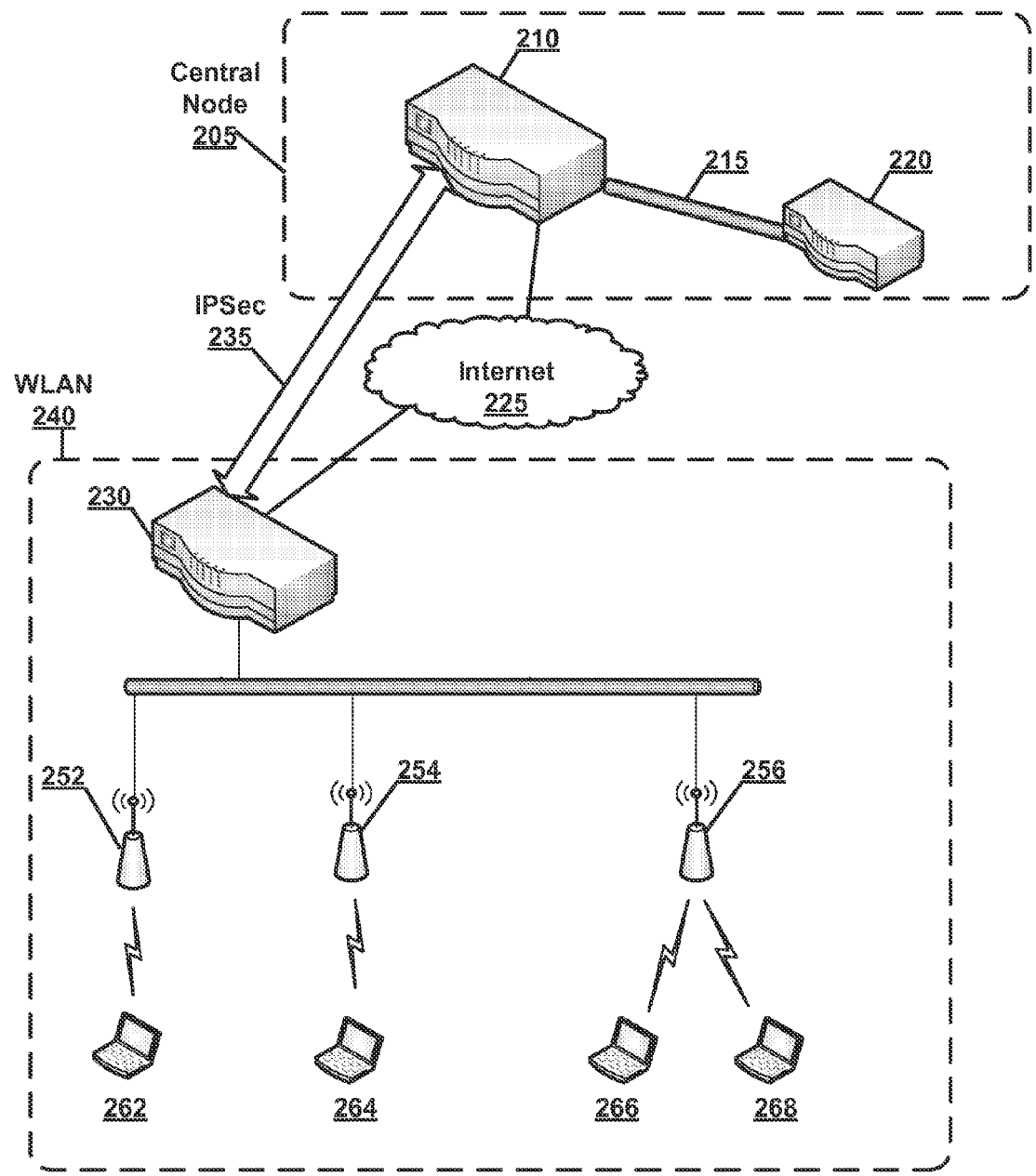
FIG. 2 shows another exemplary wireless digital network environment according to embodiments of the present disclosure.

FIG. 2 shows another exemplary wireless digital network environment according to embodiments of the present disclosure. FIG. 2 includes network devices 210 and 220 which are coupled to each other at central network node 205 via wired network 215, and wireless local area network (WLAN) 240 at a remote network node, which is coupled to network device 210, e.g., a master controller, at central network node 205 via Internet 225. Specifically, WLAN 240 includes network device 230, which is coupled to both the Internet and access points 252, 254, and 256 in WLAN 240. Access points 252, 254, and 256 can be coupled to one or more client devices 262, 264, 266 and 268. In some embodiments, access points 252, 254, and 256 can be "thin" access points that collaboratively perform network configuration and management functions. For example, access points 252, 254, and 256 can firewall network packets from client devices 262, 264, 266, and 268 according to configured policies, decrypt, and decapsulate the packet. Access points 252, 254, and 256 can then tag the network packets with configured virtual local area network (VLAN) before bridging the network packets to network device 230. In some embodiments, besides a switch, a router, or a controller, network device 230 can also be a remote access point (RAP). When network device 230 is a RAP, access points 252, 254, and 256 appear to network device 230 as if they were connected directly to network device 230 through a wired connection via a bridge-mode wired port.

(1) Remote Access Point Configuration Via Virtual Controller

Configuration of access points 252, 254, and 256 can be performed through a virtual controller interface. A virtual controller usually is a logical entity providing an anchor for functionalities such as 802.1X authentication, automatic RF management, centralized firmware and configuration management, seamless growth, wireless security, multiple service set identifiers (SSIDs) with segregated user traffic and seamless stateful roaming, and so on. The virtual controller can run on one or more physical access points, such as access points 252, 254, or 256. For example, in one embodiment, the virtual controller automatically provisions guest users without the need for manual configuration. Therefore, relevant services like Dynamic Host Configuration Protocol (DHCP) and Network Address Translation (NAT) are enabled automatically and guest traffic is segregated on the wired network requiring no separate VLANs on upstream wired switches. In one embodiment, the virtual controller acts as a single anchor for Remote Authentication Dial-In User Service (RADIUS) requests from all wireless client devices, regardless of which AP they connect through.

Moreover, in some embodiments, the virtual controller can have the ability to configure multiple SSIDs in bridge-mode in all possible authentication methods and VLANs. Note that besides the requirement that VLANs configured by the virtual controller on the SSIDs shall be supported by RAP 230, configuration of the virtual controller is mostly independent of the deployment of RAP 230. Depending on the VLANs in the DHCP server configuration on RAP 230, in some embodiments, RAP 230 serves (corporate) IP addresses to wireless client devices 262, 264, 266 or 268; and in other embodiments RAP 230 serves (non-corporate) IP addresses to wireless client devices 262, 264, 266 or 268. In one particular embodiment, RAP 230 can act as a router, a Virtual Private Network (VPN) client, a survivable DHCP server, and a Domain Name System (DNS) proxy to WLAN 240 while being remotely configured from central network node 205.

Note that, when DHCP address allocation is done at the central network node, the corporate uplink has to be always up for a wireless client device to get an IP even though the wireless client device may actually only communicate to the Internet or locally. In contrast, when RAP 230 acts as a DHCP server, RAP 230 provides dynamic survivable DHCP sub network allocation, e.g., by dividing up the sub network address space according to specified sizes and pre-allocating the sub network addresses. In some embodiments, the IP address allocation for access points 252, 254, and 256 and wireless client devices 262, 264, 266, and 268 are completed locally at network device 230, which can be a head-end remote access point, in each branch office, whereas the sub network for address allocation is decided by controller 210. In one embodiment, an administrator can provide complete sub network addresses to be allocated for all network devices 230 connected to the central network node from remote network nodes.

(2) IP Address Management

Conventionally, a backup SSID is used when the secure communication channel connection, such as IPSec tunnel connection, is down. Thus, wireless client devices have to use the backup SSID during the IPSec tunnel's down-time to connect to the central network node; and have to switch back to the normal SSID when the secured channel is restored.

With the dynamic address allocated according to the present disclosure, corporate routable addresses will be allocated even when the secure communication channel to the corporate controller is down. In some embodiments, network device 230 can be a standalone remote access point acting as a DHCP server for its wired and/or wireless client devices, serving corporate addresses even without corporate connectivity. Note that, without IPSec connection 235, no corporate network resources can be reached by wireless client devices at the remote network nodes. However, when IPSec connection 235 comes back up, the corporate connectivity will be restored. Thus, when the secure communication channel is restored, the wireless client devices do not need to change wireless SSID or renew their IP addresses to obtain corporate connectivity.

In some embodiments, network device 230 can create a trusted base generic routing encapsulation (GRE) tunnel when a split virtual access point is configured, so that all corporate network traffic will be transmitted to the remote network node via GRE tunnel. Further, the GRE tunnel is added to all VLAN multicast tables which are configured in network device 230, such that all broadcast traffic for a VLAN is also transmitted via the GRE tunnels. Thus, a Layer-2 network can be created across all network devices 230 in all remote network nodes or branch offices and controller 210 in the central network node with the ease of deploying only one network device (e.g., remote access point) at each remote network node.

In other embodiments, controller 210 will only be an endpoint for IPSec connection 235, and all configurations for wireless devices in WLAN 240 will be sent to network device 230. Thus, instead of placing a Layer-2 network across all remote network nodes, proper static routed infrastructure can be created in this alternative deployment scenario. Thus, when network device 230 attempts to connect itself to controller 210 at central node 205, if DHCP profiles are present in a list on controller 210, then a static route will be created for each DHCP sub network being allocated to network device 230 to point to IPSec tunnel 235. In some embodiments, the created static routes are stored in a route table. For any downstream IP packets for wireless client devices 262, 264, 266, and 268, the route table is consulted for the IP address of destination wireless client device. Also, an IPSec header is created and inserted in each downstream IP packet sent to network device 230. Thus, a downstream packet may look like: II IPSec I Data II. All packets destined for the DHCP sub networks allocated by controller 210 will be routed to controller 210 by an upstream router (not shown).

(3) Static Routing in the AP

Typically, for split wireless clients on a RAP, for which corporate traffic goes to the controller via a secured communication channel, such as, IPSec connection, nothing special is required to be done. Specifically, each split wireless client receives a corporate IP address from a corporate DHCP server and has a corporate gateway. Therefore, the Media Access Control (MAC) destination address for a packet can point to a location in the central network node due to a datapath bridge table entry. Note that as long as the packet is permitted by the RAP firewall, it will be routed through the secure communication channel, e.g., IPSec connection. For traffic destined to the Internet, the RAP firewall can add a src-nat policy rule and apply it to the packet; hence, the packet will be routed to the local next hop gateway of the RAP.

Nevertheless, for bridge clients on the RAP or wireless devices that appear to the RAP as bridge clients, the DHCP server and the gateway are local. Therefore, all packets that are destined to either an Internet IP address or a corporate IP address are routed to the local next hop gateway. Hence, Access Control Lists (ACLs) cannot be added in the firewall to direct the packet into the IPSec tunnel. Therefore, proper static routing support has to be added on the RAP datapath. Specifically, a routing profile with at least the following elements can be created:

Corporate IP address;
Corporate sub network; and
Switch IP address to send the corporate traffic.

This routing profile is sent to the RAP. Then, the RAP inserts the routes into its datapath. Because the switch IP has a Linux route already sending it to the tunnel device for doing IPSec, all packets which are destined for this corporate IP address can get routed into the IPSec tunnel. Note that, there is no GRE tunnel involved since the IPSec tunnel is used to send the packet to the controller. Thus, an upstream packet looks like: ‖IPSec ‖Data ‖.

Note that, there can be multiple such static routes added to the RAP datapath, for different corporate sub networks.

Also, this static routing profile will be used for multiple IPSec connections, where the RAP opens a separate IPSec connection to each different data controller. In such scenarios, the switch IP address for a corporate sub network will be that of the data controller to which the corporate traffic needs to be sent.

(4) Address Management in the Controller

In some embodiments, the DHCP server configuration on the RAP is stored in a profile. Note that, there can be multiple such DHCP profiles, which can be added on a per AP group or per AP name basis, for each SSID VLAN configured on the corporate network. In addition to the standard parameters for a DHCP configuration, there is a per-site-addresses parameter, which determines the address space size of the dynamic address allocation for each remote network node. In one embodiment, by default, each DHCP sub network configured on a VLAN has a /16 range, giving $2^{16}$ IP addresses. For each remote network node, this IP address space is divided into /24 range. Thus, each RAP will be allocated 256 addresses. Accordingly, 256 RAPs can be configured from this sub network. In an alternative embodiment, the default address ranges can be changed to accommodate the maximum number of RAPs and the number of wireless clients at each remote network node.

It shall be noted that FIGS. 1 and 2 are depicted for illustration purposes only. Many other possible network settings can exist. For example, in one embodiment, more than two WLANs may be in communication with a central network node. In another embodiment, a WLAN may be sub-divided into one or more VLANs. In some embodiments, the remote network node may comprise a hybrid wireless and wired network.

Remote Node Configuration and Management

Figure 3:
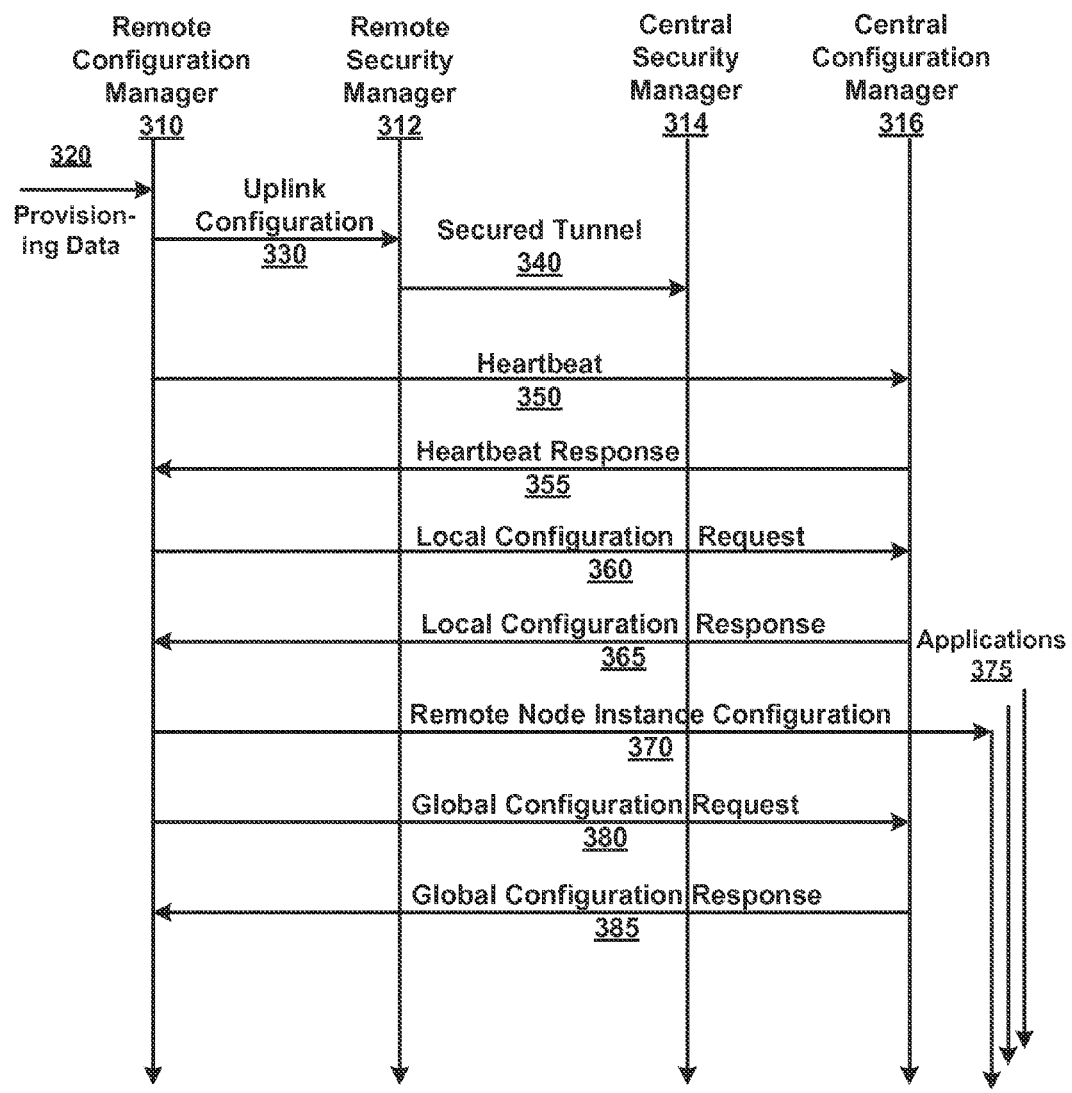
FIG. 3 shows a sequence diagram illustrating network communication exchanges between remote network devices and central network devices according to embodiments of the present disclosure.

FIG. 3 shows a sequence diagram illustrating network communication exchanges between remote network devices and central network devices. Such communication exchanges may facilitate, for example, remote node provisioning and remote node configuration.

(1) Remote Node Provisioning

In order to accomplish remote node provisioning, a remote network device at the remote network node connects to a controller at the central network node, and receives local and global configuration information. In one embodiment, provisioning data for a remote network node can be provided as a part of a setup dialog or a setup wizard. In some embodiments, the provisioning data includes the address of master controller at the central network device, and optionally the uplink information. If no uplink information is provided, Dynamic Host Configuration Protocol (DHCP) will be used and a selected port, e.g., the first port, of the remote network node will be the designated uplink port. In other embodiments, factory certificate-based IPsec configuration can be used. Such provisioning data is stored as a part of a database and will be used to connect to controller at the central network node after the initial provisioning.

The controller at the central network node can validate a remote network node based on a pre-defined whitelist, which includes information regarding multiple remote network nodes that the controller at the central network node is allowed to connect to. In some embodiments, the whitelist also provides a configuration profile to which a respective remote network node belongs.

After a remote network node is connected to controller at the central network node, configuration manager on the remote network node will request for the local configuration information. In some embodiments, the configuration manager on the remote network node also request for global configuration information, in alternative or in addition to the local configuration information, from the controller at the central network node. In some embodiments, local configuration information can be derived from the remote node configuration profile.

Note that provisioning data is often required to enable the remote network node to connect to controller at the central network node. Provisioning data on the remote network node can be, but are not limited to be, stored in a database, such as RN-provisioning-db.

(2) Remote Node Configuration

In embodiments of the present disclosure, configuration for a remote network node is typically defined in a profile, such as remote node profiles. These remote node profiles can be, but are not limited to be, defined on the controller in the central network node, such as a corporate central network for example.

In one example according to embodiments of the present disclosure, a "remote node profile" is a local configuration template that contains necessary commands for making the controller to become active. For example, portions of the remote node profile can specify VLAN's interface, VLAN membership, Layer 3 VLAN interfaces, Generic Routing Encapsulation (GRE) tunnels, management users, etc. Other portions of the remote node profile can be derived dynamically, for example, the IP addresses corresponding to remote access points or other network devices can be derived at the time of instantiating a remote-node-profile instance for the remote network node. Specifically, in some embodiments, those IP addresses can be defined or flagged with a keyword, such as "internal" to indicate that the address will be replaced when the configuration information is transmitted to the remote network node.

In some embodiments, a pool of multiple IP address pools is specified in the remote node profile configuration template. For example, IP addresses that will be used in a remote node profile instance may be defined in a remote node DHCP pool variable. The remote node DHCP pool variable defines the VLAN that is associated with the pool of IP addresses, as well as the range of IP addresses to be allocated for each remote network node.

FIG. 3 includes remote configuration manager 310, remote security manager 312, central security manager 314, and central configuration manager 316. Among these modules, remote configuration manager 310 and remote security manager 312 are typically deployed in a remote network node, for example, at a branch corporate office; whereas central security manager 314 and central configuration manager 316 are typically deployed at the central network node. In some embodiments, remote configuration manager 310 configures access points at the remote network node. In some embodiment, remote security manager 312 and central security manager 314 are responsible for collectively and collaboratively maintaining a secured channel between two end points, such as a controller or a RAP at the remote network node and a controller at the central network node. Central configuration manager 316 centrally maintains configuration information for local controllers at the central network node as well as for network devices, e.g., controllers or access points, at the remote network nodes.

After remote configuration manager 310 reboots, it will search a provisioning database to determine whether provisioning data is available. Remote node provisioning data contains information about the controller at the central network node, and how to connect to the controller. Specifically, information contained in the remote node provisioning data may include, but do not limit to, the followings:

An IP address or a fully qualified domain name (FQDN) of the remote node controller or RAP at the central network node;

IPsec key or factory-installed certificates for the remote node controller or RAP at the central network node; and Information about uplink connectivity.

In some embodiments, the uplink connectivity can be a wired connection. In other embodiments, the uplink connectivity can be a cellular connection. Moreover, when the uplink connectivity is a wired connection, the information about uplink connectivity may further include, but does not limit to, an uplink port, a static IP address (such as IP address, IP mask address, IP default gateway, etc.), dynamic IP address (such as IP address allocated by DHCP), and/or Point-to-Point Protocol over Ethernet (PPPOE, such as a user name and/or password). All of the above information can be stored in a database, such as a remote node provisioning database.

If remote node provisioning data is not available from the database search, then an interface, such as a setup dialog or a setup wizard, will be presented to a user or administrator. In one embodiment, the setup dialog or wizard provides an option to make a controller or RAP as a remote network node. In some embodiments, the setup dialog or wizard requires the user/administrator to specify part of or all remote node provisioning data as described above. In some embodiments, the remote node provisioning data specified through the setup dialog or wizard will be entered into the provisioning database.

In particular, according to one embodiment, remote network node will be rebooted once the provisioning data is written to the provisioning database. Subsequent to the reboot, remote configuration manager 310 will attempt to retrieve uplink configuration 330 information from the provisioning database. In one embodiment, uplink configuration commands are executed to setup the uplink VLAN for connectivity between remote configuration manager 310, which is deployed on the remote network node, and central configuration manager 316, which is deployed on a controller at the central network node. Note that, IP address of the controller will not be set to be the IP address for the uplink VLAN. In addition, provisioning data will also contain the IP address or IPsec key for the controller at the central network node. This information will be sent to remote security manager 312 as remote node controller (RNC) or remote access point (RAP) IP address. Remote security manager 312 will establish a secured tunnel 340 with central security manager 314 at the central network node using the configured uplink.

In some embodiments, secured tunnel 340 is an IPsec tunnel which is similar to the secured tunnel established between a master controller and a local controller at the central network node. However, it shall be noted that secured tunnel 340 can be implemented using any protocol that provides secured communication channels. After successfully establishing the IPsec tunnel, remote configuration manager 310 will transmit a heartbeat 350 to central configuration manager 316. In some embodiments, central configuration manager 316 responds with heartbeat response 355. Note that heartbeat response 355 may be the same as or different from heartbeat 350. According to one embodiment, heartbeat response 355 being different from heartbeat 350 indicates that the remote network node on which remote configuration manager 310 resides does not have the most up-to-date configuration profile downloaded.

In other embodiments, central configuration manager 316 may skip heartbeat response 355 to limit the number of remote network nodes to be configured simultaneously and thereby improve system performance. In yet another embodiment, central configuration manager 316 may choose to respond with the same heartbeat 350 that it received from remote configuration manager 310 to limit the number of remote network nodes to be configured simultaneously.

Note that, for this embodiment, the same heartbeat indicates that there is no need to update the configuration of network devices at the remote network node, or that the remote node controller has exceeded its capacity to update the configuration for the remote network nodes. For example, assuming that (1) three remote network nodes are transmitting a heartbeat HB=1 to the remote node controller at the central network node, (2) the remote node controller maintains a heartbeat HB=2, and (3) the remote node controller can only respond to two remote network nodes at a time, the remote node controller will then transmit a heartbeat response HB=2 to the first and second remote network nodes and a masked heartbeat response HB=1 to the third remote network node. Because the third remote network node receives a heartbeat response that contains the same HB number, unlike the first and second remote network nodes, the third remote network node will assume that there is no need to update the configuration of network devices at the remote network node. After the first (or second) remote network node finished downloading and applying configurations, the remote network node will update its heartbeat to HB=2, so as to notify the remote node controller at the central network node that the remote network node has completed the configuration process. Since each remote network node consistently transmits a heartbeat signal to the remote node controller at a predefined fixed interval, the remote node controller will continue to receive from the third remote node heartbeat HB=1. Thus, after the first (or second) remote network node finishes its configuration process, the remote node controller would have capacity to configure the third remote network node. Accordingly, the remote node controller would respond with its true heartbeat HB=2, so that the third remote network node will start its configuration update process.

If heartbeat response 355 is successfully received by remote configuration manager 310, and if heartbeat response 355 indicates that the configuration of the network devices at the remote network node needs to be updated, then remote configuration manager 310 will transmit a local configuration request 360 to central configuration manager 316. Upon receipt of local configuration request 360, central configuration manager 316 will transmit a local configuration response 365 back to remote configuration manager 310. In some embodiments, local configuration response 365 is transmitted as a part of a remote node instance configuration 370, which can be transmitted to applications 375. Remote node instance configuration 370 will also contain the controller IP, which is the IP address for the controller at the central network node. The controller IP will also be published to applications 375. In addition, remote network node will apply remote node instance configuration 370 to configure the remote node instance and storing the remote node instance locally. After successful configuration, remote configuration manager 310 will transmit a global configuration request 380 to central configuration manager 316, which is deployed on the remote node controller at the central network node. In response, central configuration manager 316 will transmit a global configuration response 385 back to remote configuration manager 310. Similar to remote node instance configuration 370, the global configuration can be pushed to applications 375 as well.

A remote network node can be removed by a remote node controller in the central network node from a remote node whitelist, if the remote network node fails to heartbeat with the remote node controller and does not return to heartbeat within a pre-defined time period. In some embodiments, the value of the pre-defined time period can be configurable by a user or administrator based on the heartbeat interval value, for example, the pre-defined time period can be set to "(heartbeat interval value set by configuration manager) *1080". In one embodiment, the default heartbeat interval value is set to 10 seconds. Note that a remote node DHCP instance will be re-used only when all available remote node DHCP instance blocks are completed exhausted. Thus, if a remote network node restores itself after being removed from the remote node whitelist, but before its DHCP instance is re-used, the remote network node will be assigned the same DHCP instance as it was assigned during its previous connection to the central network node.

In some embodiments, if a remote network node is not present in the remote node whitelist, then the remote network node controller will reject the configuration request from the remote network node with an error message, which indicates that the remote network node is not in the remote node whitelist. In some embodiments, remote network nodes satisfying certain pre-approved conditions may be automatically added to the remote node whitelist, or an administrator may be prompted of the event accordingly.

Note that although a heartbeat mechanism is described above, any equivalent mechanism that provides synchronization or version control may be used instead of the heartbeat mechanism without departing the spirit of the present disclosure.

It shall be noted that upon establishment of a secured communication tunnel, network devices at the remote network nodes and the central network node regularly exchange heartbeat at fixed time intervals. The requests for local configuration, global configuration, and/or remote node instance configuration, however, can be transmitted sequentially, concurrently, separately, and/or in combination. Moreover, partial update to the local configuration, global configuration or remote node instance configuration is also possible.

In some embodiments, when remote node controller at the central network node is unreachable from the remote network node, the remote network node will use previously received configuration and license information to continue functioning.

Remote Node DHCP Pool

Figure 4:
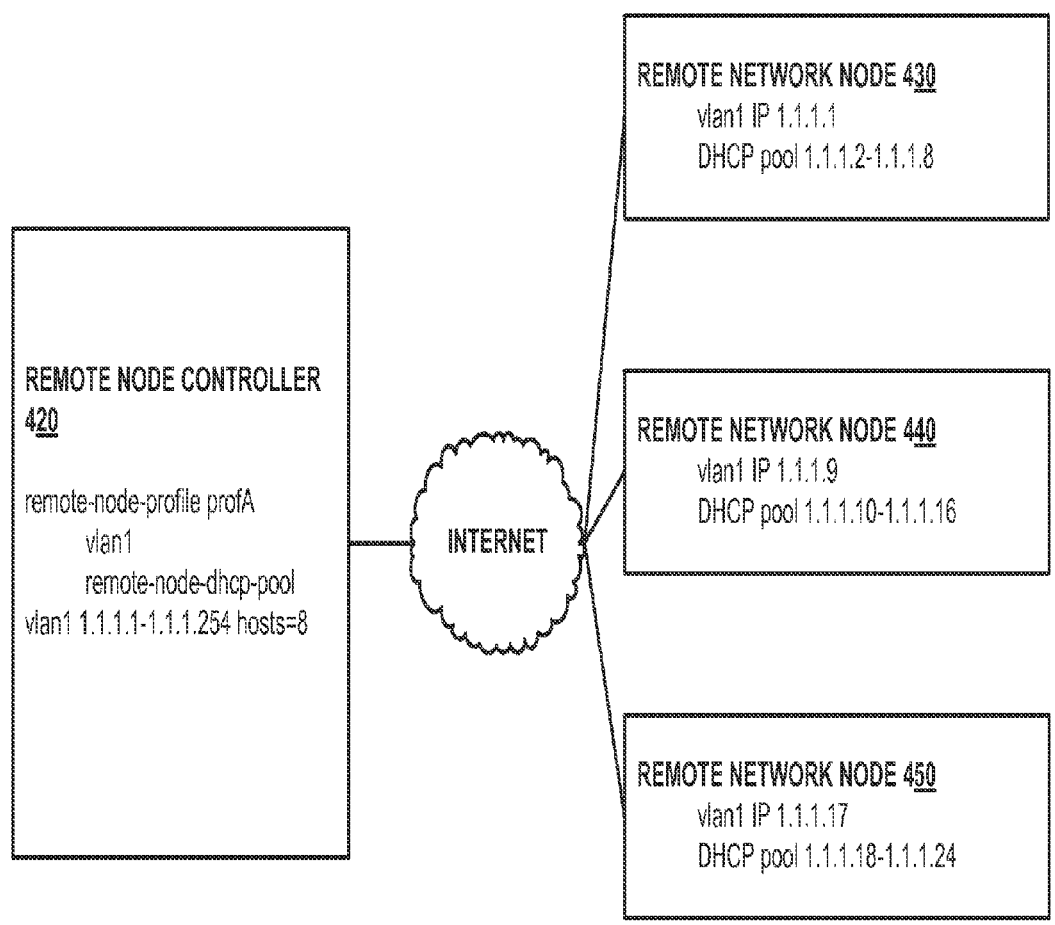
FIG. 4 is a block diagram illustrating an example configuration of dynamic distributed address management for multiple remote network devices according to embodiments of the present disclosure.

FIG. 4 is a block diagram illustrating an example configuration of dynamic distributed address management for multiple remote network devices according to embodiments of the present disclosure. The configuration system illustrated in FIG. 4 includes remote node controller 420, remote network node 430, remote network node 440, and remote network node 450. Remote node controller 420 is coupled to remote network nodes 430, 440, and 450 via Internet. A remote node profile "profA" is configured for remote node controller 420. "profA" specifies at least a VLAN, e.g., vlan1, associated with remote node controller 420, and a command, such as remote-node-dhcp-pool. The "remote-node-dhcp-pool" command identifies a large range of IP addresses that will be divided into address blocks that will be used as a DHCP pool address range for VLANs or tunnels defined in the profile. Letting remote node controller 420 manage the DHCP pool address allocation ensures that each remote node's IP address will be unique across the entire network; and therefore, IP addresses will be unique for all host devices attached to each remote network node. It also provides for a simplified and centralized way of configuring DHCP pool assigned addresses for the entire network.

Specifically, in one embodiment, the following parameters are specified when configuring the DHCP address pool:

Name—Name of the remote node DHCP address pool;
SIP—Start of IP address range of the DHCP address pool;
EIP—End of IP address range of the DHCP address pool;
Pool_type—DHCP pool type, which is used for VLAN's or tunnels;
VLAN_Id—Identifier of VLAN to which the DHCP pool addresses should be applied;
Number_of_hosts—Number of hosts supported in a remote network node using the DHCP address pool;
etc.

In one embodiment, an IP address block the size of Number_of_hosts will be allocated when instantiating the configuration for a remote network node. The first address in the block will be used as IP address of the VLAN. A DHCP address pool is created with remote controller 420 as a default-gateway and DNS server. This IP block will be associated with the remote network node. The IP block information will be stored in a remote node instance database. The IP block information will be retained until the remote network node is completely removed from remote node controller 420.

For example, in FIG. 4, the number of hosts supported in a remote network node is 8. Thus, IP block 1.1.1.1 to 1.1.1.8 is associated with remote network node 430; IP block 1.1.1.9 to 1.1.1.16 is associated with remote network node 440; IP block 1.1.1.17-1.1.1.24 is associated with remote network node 450; and so on. Because the first address in the block will be used as IP address of the VLAN, the VLAN IP address for remote network node 430 will be 1.1.1.1; the VLAN IP address for remote network node 440 will be 1.1.1.9; the VLAN IP address for remote network node 450 will be 1.1.1.17; and so on.

Remote Node Configuration Profile Validation

Each configuration profile can be associated with a controller model. Validation of configuration profile thus can be done based on the controller model information. In some embodiments, a configuration profile will not become active until after proper validation command on a profile has been run successfully.

The following list includes a few configuration validation scenarios according to embodiments of the present disclosure:

A remote node configuration profile has been created without running a validation command, the remote node configuration profile will be inactive and the remote network node using this profile will not become active;

A remote node configuration profile has been created and validated, the remote node configuration profile will be active and all remote network nodes using this configuration profile will receive the remote node configuration instance;

A remote node configuration profile has been created and validated, which allows the remote node configuration profile to become active and to be sent to remote network nodes. After the initial validation, the remote node configuration profile is modified without running a validation for the modification. This will make the remote node configuration profile inactive. Therefore, new remote network nodes with this configuration profile will not be activated, and existing remote network nodes that are already active with this configuration profile will not receive any modifications. This can be the case even after committing the configuration with write memory command.

A remote node configuration profile has been created and validated, and then modified and activated. All new remote network nodes with this configuration profile can be active and running properly, and all committed changes will be sent. After committing the changes, the new modifications to the configuration profile will be sent to all active remote network nodes.

Some modifications to the remote node configuration profile may require the remote network nodes to be rebooted. In such scenarios, users can be warned at the time of either modification or validation that the changes if committed will automatically reload the remote network nodes. In one embodiment, these cases will be identified and documented.

Configuration management between the remote network nodes and the remote node controller in a central network node can be similar to the configuration management between a master controller and a local controller at the central network node. Specifically, the remote node controller can maintain a remote node configuration identifier, which will be part of the heartbeat messages exchanged between the remote network nodes and the remote node controller. Based on the remote node configuration identifier received from remote network nodes and the current remote node configuration identifier, the remote node controller will generate a remote node configuration instance that will be sent to the remote network node.

Remote Node Configuration and Management Process

Figure 5:
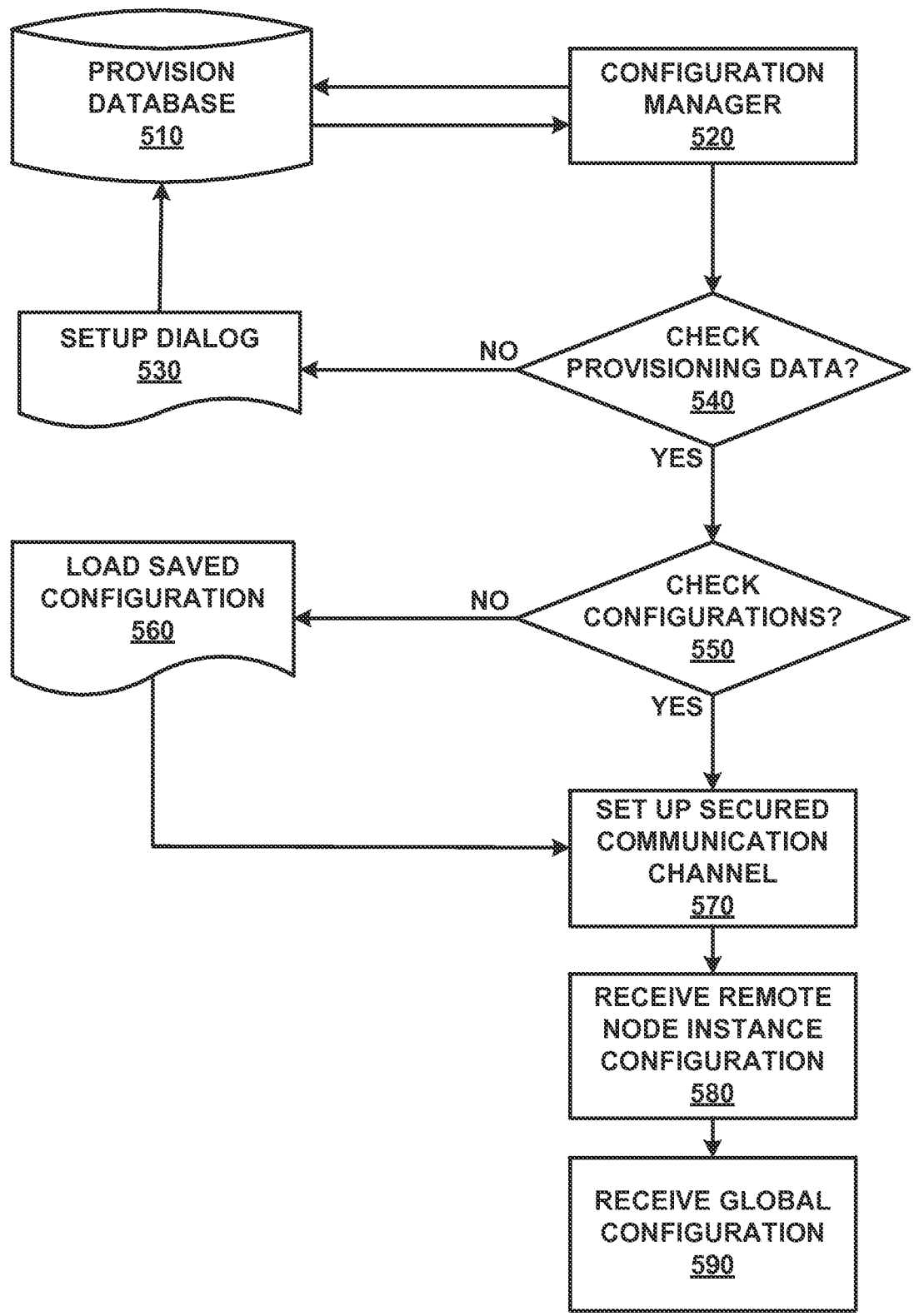
FIG. 5 is a flowchart illustrating an exemplary configuring process of remote network devices at a remote network node according to embodiments of the present disclosure.

FIG. 5 is a flowchart illustrating the configuring process of remote network devices at a remote network node. During operation, after configuration manager 520 reboots, configuration manager 520 connects to provision database 510 and attempts to retrieve provisioning data. The remote network device then checks 540 whether provisioning data is successfully retrieved. If not, the remote network device presents a setup dialog 530 or a setup wizard (not shown) to prompt a user or an administrator to enter provisioning data. The provisioning data entered by the user or the administrator will be stored in provision database 510.

If provisioning data is successfully retrieved from provision database 510 or received from setup dialog 530 (or setup wizard), the remote network device further checks 550 the database for uplink configuration information. If the uplink configuration information is successfully found, the remote network device will apply the uplink configuration. If the uplink configuration information is not found, the remote network device will load previously received or saved configuration information 560 to apply the uplink configuration. Next, the remote network device uses the configured uplink to set up a secured communication channel 570, such as IPsec tunnel.

Through the secured communication channel, the remote network device will receive a remote node instance configuration 580, which includes local configuration information as requested by the remote network node. Remote node instance configuration may contain the IP address for the controller at the central network node. The remote network node will subsequently apply the received remote node instance configuration to configure the remote node instance and storing the remote node instance locally. Next, the remote network device will receive global configuration information 590 in response a corresponding request. The remote node instance configuration and the global configuration can be pushed to applications.

Figure 6:
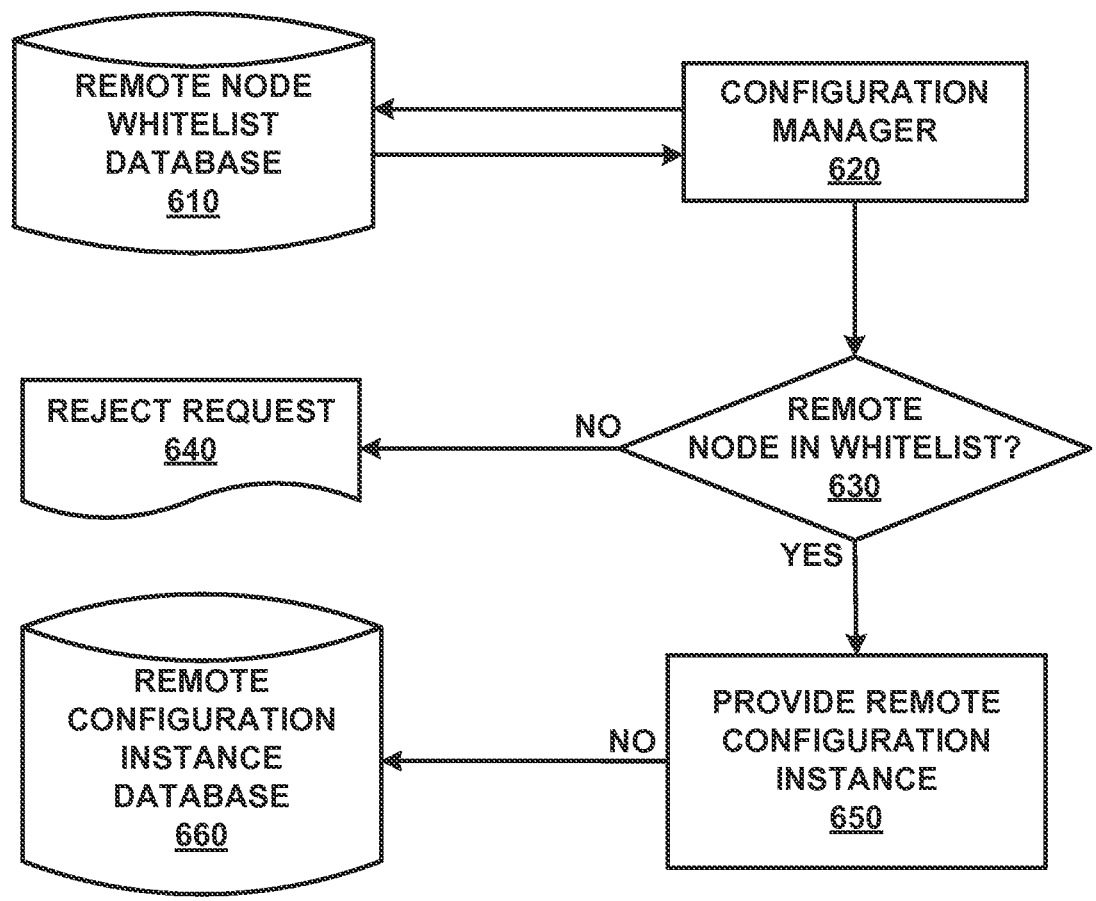
FIG. 6 is a flowchart illustrating an exemplary configuring process of remote network devices allowed to connect to a central network node according to embodiments of the present disclosure.

FIG. 6 is a flowchart illustrating the configuring process of remote network devices at a central network node. When configuration manager at the central network node receives a heartbeat from a configuration manager at a remote network node (operation 620), the corresponding network device at the central network node checks a remote node whitelist database (operation 610) to determine whether the remote network node exists in the remote node whitelist (operation 630). Remote network nodes in the remote node whitelist are typically defined in a table using the MAC addresses corresponding to remote node controllers. If a remote network node is in the whitelist, the whitelist will also include the corresponding configuration profile of each remote network node. A configuration manager at the remote node controller in the central network node will use the configuration profile to generate a remote node configuration instance (operation 650). The remote configuration instance will be stored in a remote node instance database (operation 660), and will be re-used for this remote network node as long as the remote network node remains in the remote node whitelist.

In one embodiment, if the remote network node is not present in the whitelist, then the remote node controller will reject the remote network node with an error message (operation 640), which indicates in an error log that the remote network node is not in the whitelist. Automatic addition of remote network nodes to the whitelist may or may not be supported.

Figure 7:
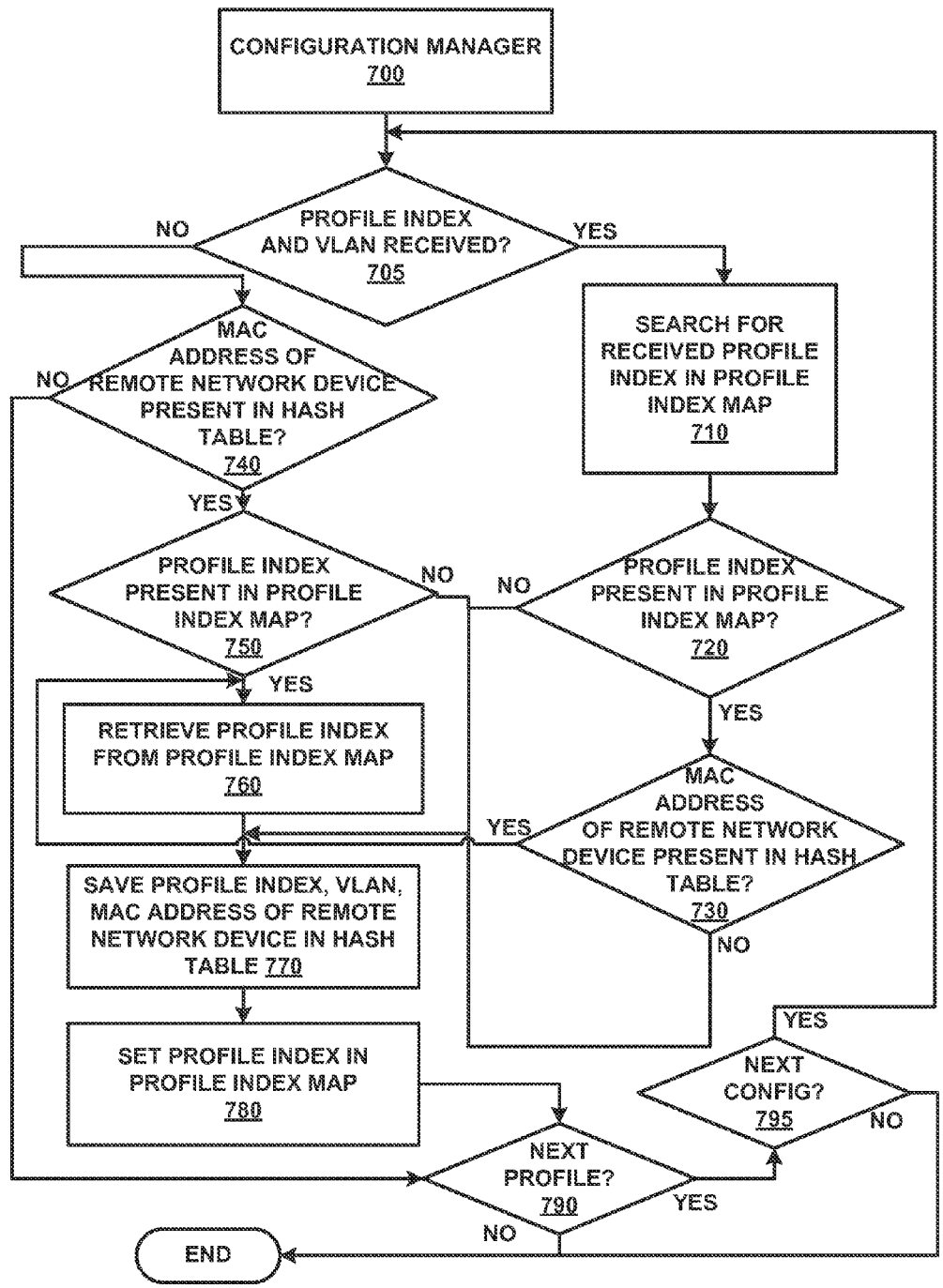
FIG. 7 is a flowchart illustrating an exemplary configuring process of remote network devices at a remote network node according to embodiments of the present disclosure.

FIG. 7 is a flowchart illustrating an alternative exemplary configuring process of remote network devices at a remote network node. The configuring process illustrated in FIG. 7 corresponds to the network computing environment depicted in FIG. 2. As described above in reference to FIG. 2, network device 230 needs to be provided with a controller address for making IPSec connection 235. Moreover, the Media Access Control (MAC) address of network device 230 needs to be added to the whitelist on controller 210. In one embodiment, the wired ports of network device 230 are configured to be in trunk mode with the native VLAN as the one where access points 252, 254 or 256 will get its IP address from. Further, the allowed VLANs may include all VLANs configured in the wireless SSIDs corresponding to access points 252, 254, and 256. In addition, a DHCP profile and a routing profile need to be configured for network device 230.

Note that access points 252, 254, and 256 located behind a head-end network device, for example a remote access point, are connected to each other via a Layer-2 network. Configuration process illustrated in FIG. 7 serves the following objectives: First, access points 252, 254, and 256 need to be reachable from central node 205 for manageability, so that the virtual controller's management web page of any branch office can be accessed from central network node 205. Moreover, wireless client devices 262, 264, 266, and 268 connected to access points 252, 254, or 256 should be able to reach both central network node 205 via IPSec tunnel 235 created by network device 230 and Internet 225. In order to avoid breaking applications, wireless client devices should be allocated addresses from corporate sub networks without any Network Address Translation (NAT) required. Also, this address allocation needs to survive a corporate link failure, a network device 230 (e.g., a remote access point) reboot, a controller reboot, or a failover of network device 230 to a backup controller.

In one embodiment, the DHCP profile used in the configuration process includes the following contents:
DHCP Server VLAN 1
DHCP Server Id 10.1.0.1
DHCP Default Router 10.1.0.1
DHCP DNS Server <dns>
DHCP Pool Start 10.1.0.2
DHCP Pool End 10.1.255.254
DHCP Pool Netmask 255.255.0.0 or /16
DHCP Lease Time 10 days
Per Site Addresses 255.255.255.0 or /24

During operations, a DHCP profile is created in configuration manager (operation 700). Correspondingly, a hash table, such as a DHCP allocation table, is also created for the VLAN associated with the DHCP profile. The size of the DHCP allocation table can be, for example, 2^(Per_Site_Addresses—DHCP_Pool_Netmask), which indicates the total number of separate remote network nodes (e.g., remote access points) supported by the DHCP profile. Typically, one global DHCP allocation table is created for each VLAN. The global DHCP allocation table will contain the MAC address of remote network device to which each DHCP address in the DHCP allocation table has been allocated. A single command may be provided to view the DHCP allocation table.

When a remote network device (e.g., a remote access point at the remote network node) registers with a controller in central network node, a configuration manager on the controller determines whether a remote network device has a DHCP profile configured for it. If so, the configuration manager assigns the remote access point an used (free) sub network for each VLAN from the table. On the other hand, if the remote network device already has a DHCP sub network allocation, then the configuration manager will assign the same sub network to the remote network device.

In one embodiment, the configuration manager in a remote network node can generate a unique key based on the MAC address of a virtual controller, which is elected from one or more network devices at the remote network node or branch office. The generated key is used to identify a remote network node (or branch office) uniquely, and once generated, will be preserved in a global configuration for future use. Thus, even if another device is elected to become the virtual controller, the key used to uniquely identifier the remote network node or branch office will remain the same. Initially, a secured message may be sent with the key, and optionally, with a branch identifier (BID) if such BID had already been previously generated for the remote node. The configuration manager then searches its DHCP allocation hash table for the key. If the key is not present, the configuration manager allocates a new BID for the remote network node and key. Subsequently, the same BID is returned for all BID requests from the same remote network node and key. The BID can be used as a unique way of generating the sub network specific to a remote network node from a larger sub network allocated to one or more remote network nodes. The unique BID assures separate sub networks for each remote network node. The key, which is generated
by the remote network node, and the BID, which is generated by the central network node, will be stored in the remote network node In one embodiment, the configuration manager initially allocates this sub network for a fixed time period (e.g., leased time) and subsequently the configuration manager will send (key, BID) to renew the leased time. If the configuration manager does not send any request for renewing the time, then the corresponding key will be deleted from the controller's DHCP allocation hash table and the remote network node will be deemed as in a "dead" state.

The following logic can be used for configuring the sub network at the remote network node upon receiving the (key, BID) from the configuration manager at the central network node, according to one embodiment of the present disclosure:

1. The sub network, for example, 10.17.0.0 / 16 where b = 16;
2. Number of clients per branch would be 250;
   a. Get the next integer, which is in the power of 2, using the following logic:
```
unsigned NextPow2( unsigned x )
{
    --x;
    x |= x >> 1;
    x |= x >> 2;
    x |= x >> 4;
    x |= x >> 8;
    x |= x >> 16;
    return ++x;
};
```
   thus, x = 256;
   b. c = 32 − ln(x); thus, c = 32 − 8 = 24;
3. Based on b and c, the maximum number of branches 2(c − b) and the maximum number of clients per branch is 256 (232−c).

Moreover, the virtual controller at the remote network node can use the following logic to calculate the IP sub network for a particular remote network node from the index sent by the controller:

```
int ipSubnetPerBranch (int ipSub, int b, int c, int index)
{
    if ((1 << (c − b)) <= index) { return ERROR; };
    branchMask = index << (32− c) ;
    ipSubnetforBranch = ipSub | branchMask;
    return ipSubnetforBranch;
}
```

Specifically, the configuration manager can determine whether a DHCP profile index and/or VLAN are received from the remote network node (operation 705). If so, the configuration manager searches for the received DHCP profile index in a DHCP profile index map (operation 710).

The configuration manager then determines whether the DHCP profile index presents in the DHCP profile index map (operation 720). If the DHCP profile index presents in the DHCP profile index map, the configuration manager then determines whether the MAC address of a remote network device or DHCP profile index received from the remote network node presents in the DHCP allocation hash table (operation 730).

If the MAC address of the remote network device is present in the DHCP allocation hash table, the configuration manager will retrieve the DHCP profile index from the DHCP profile index map (operation 760), and save the DHCP profile index, VLAN, and MAC address of the remote network device in the DHCP allocation hash table (operation 770). On the other hand, if the MAC address of the remote network device is not present in the DHCP allocation hash table, the configuration manager proceeds to save the DHCP profile index, VLAN, and MAC address of the remote network device in the DHCP allocation hash table (operation 770).

Furthermore, if the DHCP profile index is not present in the DHCP profile index map, the configuration manager will also proceed to save the DHCP profile index, VLAN, and MAC address of the remote network device in the DHCP allocation hash table (operation 770).

If, however, the configuration manager determines that a DHCP profile index and/or VLAN are not received from the remote network node (operation 705), the configuration manager then determines whether the MAC address of a remote network device or DHCP profile index received from the remote network node is present in the DHCP allocation hash table (operation 740). If so, the configuration manager further determines whether the DHCP profile index presents in the DHCP profile index map (operation 750). If not, the configuration manager checks whether a next DHCP profile exists (operation 790). If the next DHCP profile exists (operation 790), the configuration manager determines whether a next configuration exists (operation 795). If so, the configuration manager repeats from operation 705 as describe above until there is no more DHCP profile or no more configuration exists.

If the DHCP profile index is determined to be present in the DHCP profile index map (operation 750), the configuration manager will retrieve the DHCP profile index from the DHCP profile index map (operation 760), and save the DHCP profile index, VLAN, and MAC address of the remote network device in the DHCP allocation hash table (operation 770). If the DHCP profile index is determined to be not present in the DHCP profile index map (operation 750), then the configuration manager proceeds to save the DHCP profile index, VLAN, and MAC address of the remote network device in the DHCP allocation hash table (operation 770).

After the DHCP profile index, VLAN, and MAC address of the remote network device are saved in the DHCP allocation hash table (operation 770), the configuration manager sets the DHCP profile index in the DHCP profile index map (operation 780), and checks whether a next DHCP profile exists (operation 790). If the next DHCP profile exists (operation 790), the configuration manager determines whether a next configuration exists (operation 795). If so, the configuration manager repeats from operation 705 as describe above until there is no more DHCP profile or no more configuration exists.

Next, the configuration manager at the controller in the central network node adds static routes to the DHCP sub networks allocated to the remote network device via the secured communication tunnel, such as the IPSec tunnel, between the remote network node and the central network node.

In one embodiment, after the remote network device receives the DHCP profiles, it writes the DHCP profiles to its local memory address that is typically used to store configuration files, and signals other components or processes, such as dnsmasq, to re-read the configuration file.

In some embodiments, the remote network device also writes the DHCP sub network allocations in the DHCP profile, such as VLAN ID and table index per DHCP VLAN, to its flash memory, so that after the remote network device reboots itself and without the controller being reachable, the same DHCP sub network IP addresses will be allocated. Subsequently, when the secured tunnel between the controller and the remote network node restores, the remote network device can include the previous DHCP sub network IP address allocation in its "Hello" message to the controller. Then, the controller can assign the requested DHCP sub network IP address, if that is still available. Therefore, the present disclosure provides for continuity of DHCP sub network IP address allocation across remote network devices and controller reboot events as well as network outages.

In some embodiments, the per-site DHCP sub network will be equal for all remote network nodes. Thus, the DHCP allocation hash table will be divided into multiple equal-sized sub networks. In some embodiments, bigger sub networks can be allocated to accommodate for bigger remote network nodes by allocating multiple contiguous sub networks for the same RAP.

The following is an exemplary DHCP profile for illustrative purposes only. Note that alternative or additional elements may be added to the profile without departing from the spirit of the present disclosure.

```
Pool_Start: 10.10.0.0
Mask: 255.255.0.0
Reserved: 5
Per_Site_Range: 255.255.255.0
Range = 2 ^ (Per_Site_Range – Mask)
Start = Pool_Start + (Range * i)
End = Start + (Range – 1) – Reserved
i = 2 ^ (Per_Site_Range – Mask)
Pool_Start: 10.10.0.0 → 168427520
Range = 2 ^ (24–16) = 2 ^ 8 = 256
Start =    168427520 + (256 * 1) = 10.10.1.0 → for i=1
           168427520 + (256 * 2) = 10.10.2.0 → for i=2
           168427520 + (256 * 3) = 10.10.3.0 → for i=3
End =      (10.10.1.0) + (256 – 1) – 5 → for i=1
           (10.10.2.0) + (256 – 1) – 5 → for i=2
           (10.10.3.0) + (256 – 1) – 5 → for i=3
```

In some embodiments, the DHCP server, e.g., dnsmasq, is enhanced so that it understands VLAN and supports multiple sub networks. For example, all VLANs that the dnsmasq handles are sent to the access point datapath, e.g., dnsmasq-vlan-set.

In one embodiment, in the remote access point datapath, for packets with VLAN tags, nothing needs to be changed. However, for packets without any VLAN tags, for example, native VLAN packets on the Ethernet trunk port, the packets are marked with the native VLAN of the Ethernet trunk port.

In some embodiments, for every DHCP packet, the VLAN associated with the packet is checked to determine whether it belongs to a VLAN set associated with a Domain Name Service (DNS) forwarder and/or a DHCP server. If so, the packet is not transmitted and only transmitted up the stack to the DNS forwarder/DHCP server. At the end of the packet, a field such as a TLV format field which is associated with the VLAN corresponding to the packet, is added so that the DNS forwarder/DHCP server knows the corresponding sub network to allocate from. Moreover, the reply from the DNS forwarder/DHCP server is tagged with the correct VLAN based on the bridge-table entry in the datapath created from the incoming packet. On the other hand, if the packet VLAN does not belong to the VLAN set associated with the DNS forwarder/DHCP server, then the packet is transmitted to the other interfaces on that VLAN as suitably tagged. Thus, other DHCP servers in the network will respond to it.

Remote Node Configuration and Management System

Figure 8:
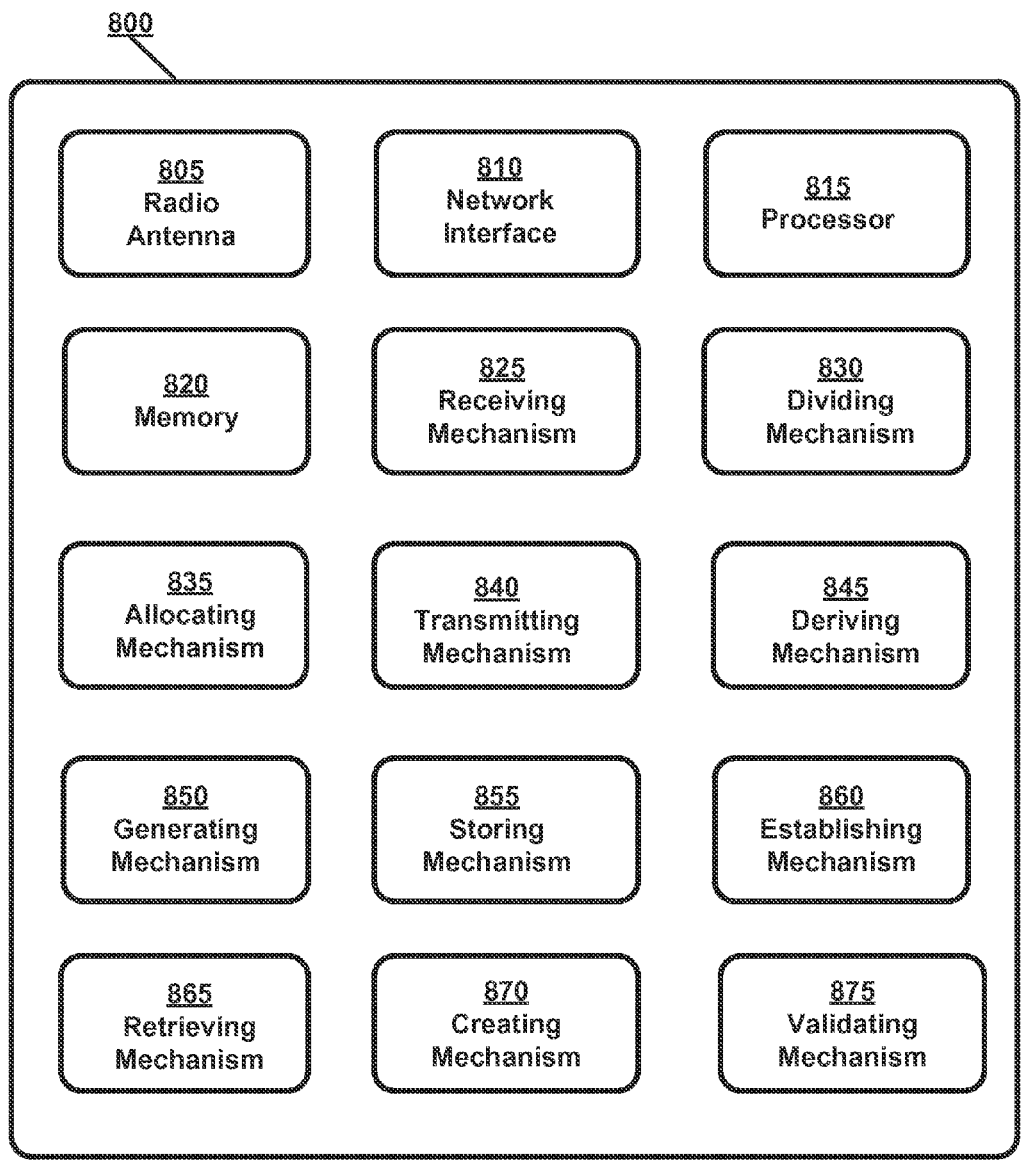
FIG. 8 is a block diagram illustrating a system for centralized configuration with dynamic distributed address management according to embodiments of the present disclosure.

FIG. 8 is a block diagram illustrating a system for band steering for multiple-band wireless clients according to embodiments of the present disclosure.

Operating as a node in a wireless digital network, network device 800 includes at least one or more radio antennas 805 capable of either transmitting or receiving radio signals or both, a network interface 810 capable of communicating to a wired or wireless network, a processor 815 capable of processing computing instructions, and a memory 820 capable of storing instructions and data. Moreover, network device 800 further includes a receiving mechanism 825, a dividing mechanism 830, an allocating mechanism 835, a transmitting mechanism 840, a removing mechanism 845, a rejecting mechanism 850, a storing mechanism 855, an establishing mechanism 860, a retrieving mechanism 865, a creating mechanism 870, and a validating mechanism 875, all of which are coupled to the processor and the memory in network device 800. Network device 800 may be used as a client system, or a server system, or may serve both as a client and a server in a distributed or a cloud computing environment.

Radio antenna 805 may be any combination of known or conventional electrical components for receipt of signaling, including but not limited to, transistors, capacitors, resistors, multiplexers, wiring, registers, diodes or any other electrical components known or later become known.

Network interface 810 can be any communication interface, which includes but is not limited to, a modem, token ring interface, Ethernet interface, wireless IEEE 802.11 interface, cellular wireless interface, satellite transmission interface, or any other interface for coupling network devices.

Processor 815 can include one or more microprocessors and/or network processors. Memory 820 can include storage components, such as, Dynamic Random Access Memory (DRAM), Static Random Access Memory (SRAM), etc. In some embodiments, memory 820 stores one or more DHCP profile templates. In one embodiment, the DHCP profiles created from the DHCP profile templates are associated with indexes in a DHCP profile index map. Moreover, in some embodiments, memory 820 also stores a DHCP profile allocation hash table. The DHCP profile allocation hash table includes at least one or more of: a sub-range of sub network addresses, a corresponding sub network allocation, a DHCP index, a VLAN identifier, and a Media Access Control (MAC) or similar physical address corresponding to a remote network device at a remote network node.

Further, memory 820 can store a pre-defined whitelist that includes all remote network devices or remote network nodes that network device 800 at a central network node are allowed to connect. The whitelist can be dynamically maintained and updated, and is used to validate requests received from various remote network nodes. Alternatively, in lieu of a whitelist, it is contemplated that a blacklist may be maintained to identify various remote network nodes with which network device 800 is precluded from establishing communications.

Receiving mechanism 825 receives one or more network frames via network interface 810 or radio antenna 805. The received network frames may include, but are not limited to, requests and/or responses, beacon frames, management frames, control path frames, and so on, as described in the present disclosure. In some embodiments, receiving mechanism 825 can receive a range of sub network addresses and a specified size of a sub network. In some embodiments, receiving mechanism 825 receives a DHCP profile template that includes the range of sub network addresses and the specified size of the sub network.

Furthermore, receiving mechanism 825 can receive requests from one or more remote network nodes. In some embodiments, the requests may be directed to local configuration information, global configuration information, or both.

Dividing mechanism 830 divides the received range of sub network addresses into a plurality of sub-ranges of sub network addresses based on the specified size. In some embodiments, dividing mechanism 830 divides the range of sub network addresses by dividing a DHCP allocation hash table into multiple sub networks. In some embodiments, the per-site DHCP sub network will be equal for all remote network nodes. In other embodiments, bigger sub networks can be allocated to accommodate for bigger remote network nodes by allocating multiple contiguous sub networks for the same RAP.

Allocating mechanism 835 can allocate the plurality of sub-ranges of sub network addresses to a plurality of sub networks. In some embodiments, the sub-ranges of the sub network addresses are allocated as DHCP address pool for remote network nodes. In some embodiments, allocating mechanism 835 allocates the same sub-range of sub network addresses for a remote network node after a temporary disconnection of a secure communication channel between network device 800 and the remote network node. In other embodiments, allocating mechanism 835 may allocate a new sub-range of sub network addresses in response to the downtime of the secure communication channel exceeds a pre-defined threshold.

Transmitting mechanism 840 transmits a network frame, including but not limited to, a control path frame or a response to a control path frame, a management frame or a response to a management frame, a network traffic frame received from wireless client devices, and so on. In some embodiments, transmitting mechanism 840 broadcasts or multicasts the network frame. In other embodiments, transmitting mechanism 840 transmits the network frame to a specific network device such as an access point, a controller, a router, or any other types of network devices. In some embodiments, transmitting mechanism 840 transmits the network frame via a wireless network interface or a radio antenna, e.g. when network device 800 communicates with other network devices in the wireless network. In other embodiments, transmitting mechanism 840 transmits the network frame via a wired network interface, e.g., when network device 800 forwards network traffic received from wireless client devices to a wired network.

In some embodiments, transmitting mechanism 840 transmits an allocated sub-range of sub network addresses to a corresponding sub network at a remote network node. In some embodiments, the allocated sub-range of sub network addresses is transmitted in a DHCP profile. For example, the DHCP profile may include, but are not limited to, a name of the DHCP address pool; a starting address of the Internet Protocol (IP) address range of the DHCP address pool; an ending address of the Internet Protocol (IP) address range of the DHCP address pool; a DHCP pool type; a DHCP pool net mask; a DHCP pool address lease time; a Virtual Local Area Network (VLAN) identifier indicating a VLAN to which addresses in the DHCP address pool are applied; an IP address of a DHCP Domain Name Service (DNS) server; an IP address corresponds to a DHCP default server; per site IP addresses corresponds to the remote network node; and a number of hosts supported by the remote network node using the DHCP address pool. In some embodiments, the number of hosts and per site addresses are determined based on an integer in the power of two next to an estimated number of wireless clients at the remote network node.

In some embodiments, transmitting mechanism 840 transmits the DHCP profile through a secure communication channel. In some embodiments, transmission mechanism 840 may transmit the same allocated sub-range of sub network addresses through the secure communication channel in response to the secure communication channel between a remote network node and a central network node being restored after a period of secure communication channel down-time.

Deriving mechanism 845 can derive network addresses on the remote node based on an identifier, a determined size of the sub network addresses, and a range of the sub network addresses.

Generating mechanism 850 may generate a branch mask code based on at least both the identifier and the determined size of the sub network addresses. Furthermore, generating mechanism 850 generates the network addresses on the remote network node by applying the branch mask code to the range of the sub network addresses.

Storing mechanism 855 can store the plurality of sub-ranges of sub network addresses and their corresponding sub network allocations in a DHCP allocation hash table. As mentioned above, the DHCP profile allocation hash table includes at least one or more of: a sub-range of sub network addresses, a corresponding sub network allocation, a DHCP index, a VLAN identifier, and a Media Access Control (MAC) or similar physical address corresponding to a remote network device at a remote network node.

Establishing mechanism 860 can establish a secure communication channel between the central network node and the remote network node. In one embodiment, establishing mechanism 860 establishes an Internet Protocol Security tunnel (IPSec) between a central network node and a remote network node. In another embodiment, establishing mechanism 860 establishes a trusted base generic routing encapsulation (GRE) tunnel when a split virtual access point is configured, so that all corporate network traffic will be transmitted to the remote network node via GRE tunnel. Further, the GRE tunnel may be added to all VLAN multicast tables, such that all broadcast traffic for a VLAN is also transmitted via the GRE tunnels.

Retrieving mechanism 865 can retrieve a profile template, which may include, but is not limited to, a range of sub network addresses and a specified size of the sub network. In some embodiments, the profile template is a DHCP profile template. In some embodiments, retrieving mechanism 865 retrieves the profile template from a DHCP profile index map based on a profile index, which is received from the remote network node.

Creating mechanism 870 can create a DHCP profile based on the profile template. The profile may include, but is not limited to, the sub-range of sub network addresses and the allocated sub network for the sub-range. Additionally, the profile may include attributes, such as, DHCP pool address lease time, a number of hosts supported by the corresponding remote network node, per site addresses corresponding to the remote network node, etc.

Validating mechanism 875 can validate that the identifier to be used by deriving mechanism 845 is within a valid index range.

Receiving mechanism 825, dividing mechanism 830, allocating mechanism 835, transmitting mechanism 840, removing mechanism 845, rejecting mechanism 850, storing mechanism 855, establishing mechanism 860, retrieving mechanism 865, creating mechanism 870, and validating mechanism 875 collectively operation with each other to process centralized configuration at a central node with dynamic distributed address management of one or more remote network nodes.

According to embodiments of the present disclosure, network services provide by managed network device 400 include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc. Note that, in some embodiments, to enable a subset of the above network services (such as RADIUS or Layer-3 forwarding), a system administrator can configure a single IP address for the entire autonomous wireless network through a management interface. This single IP address will be located only on one of the managed network devices in the WLAN, which is elected to be the virtual controller for the wireless network and which will be on the default (or native) virtual local area network (VLAN). With the virtual controller enabled, all managed network devices (e.g., access points) in the wireless network can support the subset of network services at least in part through communication exchange of multiple control path frames.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. The description is this to be regarded as illustrative rather than limiting.

We claim:

1. A computer implemented method, comprising:
    establishing a secure communication channel to transmit a heartbeat message between a plurality of remote network nodes and a remote node controller over a public network, using a network address for the remote node controller;
    receiving, from the plurality of remote network nodes, the heartbeat message;
    transmitting, using the secure communication channel, a response heartbeat message to the plurality of remote network nodes, including a particular remote network node, wherein:
        the response heartbeat message is the same as the heartbeat message; and
        the response heartbeat message to the particular remote node indicates that the remote node controller has exceeded its capacity to update a network configuration for the particular remote network node;
    receiving the network configuration for the particular remote network node over the secure communication channel when the remote node controller has capacity to update the network configuration, wherein the network configuration:
        includes a network address allocation for a remote network device and a set of network addresses for dynamically allocating to devices connected to the particular remote network node; and
        facilitates continued functioning of the particular remote network node when the remote node controller is unreachable from the particular remote network node; and
    determining a subset of network addresses of the set of network addresses to reserve for a sub-network connected to the particular remote network node, by receiving a specified size and assigning a size for the subset that is a smallest integer power of two that is greater than the specified size; and
    transmitting a sub-network profile to the sub-network, wherein the sub-network profile includes the subset of network addresses.

2. The method of claim 1, wherein the sub-network profile includes at least a starting address of the subset of network addresses and a number of hosts supported by the subset of network addresses.

3. The method of claim 1, wherein the remote network device is a remote access point for wirelessly connecting sub-network access points to the particular remote network node, the method further including:
    receiving the sub-network profile at a sub-network access point;
    allocating one address of the subset of network addresses to the sub-network access point and reserving a remainder of the subset of network addresses for dynamic allocation;
    wherein the sub-network access point is a wireless access point for wirelessly connecting client devices to the sub-network.

4. The method of claim 1, further comprising:
    in response to receiving the response heartbeat message that is different from the heartbeat message:
        transmitting a local configuration request using the secure communication channel, wherein the local configuration request includes a request for updated network configuration information for the particular remote network node; and
        receiving a local configuration response using the secure communication channel, wherein the local configuration response includes an updated network configuration for the particular remote network node.

5. The method of claim 1, further comprising:
    dynamically allocating network addresses from the set of network addresses when the remote node controller is unreachable from the particular remote network node.

6. The method of claim 1, wherein network traffic between the particular remote network node and a central network node is routed through the secure communication channel, and wherein the secure communication channel facilitates creation of a Layer-2 network that extends across the particular remote network node and the central network node.

7. The method of claim 1, wherein the secure communication channel is a generic routing encapsulation tunnel or an Internet Protocol Security (IPSec) connection.

8. The method of claim 1, wherein determining the subset of network addresses includes receiving an identifier and a size of the subset and generating a subnet mask using the identifier and the size.

9. A system comprising:
    a processor; and
    a non-transitory computer readable medium including instructions executable by the processor to:
        establish a secure communication channel to transmit a heartbeat message between a remote network node connected to a remote network device and a remote node controller over a public network, using a network address for the remote node controller;
        receive, from the remote network node, the heartbeat message;
        transmit, using the secure communication channel, a response heartbeat message to a plurality of remote network nodes, including the remote network node, wherein:
            the response heartbeat message is the same as the heartbeat message; and
            the response heartbeat message to the remote network node indicates that the remote node controller has exceeded its capacity to update a network configuration for the remote network node;
        receive the network configuration for the remote network node over the secure communication channel when the remote node controller has the capacity to update the network configuration, wherein the network configuration includes a network address allocation for the remote network device and a set of network addresses for dynamically allocating to devices connected to the remote network node, wherein the set of network addresses correspond to routable addresses for a central network node;
        dynamically allocate network addresses from the set of network addresses when the remote node controller is unreachable;

determine a subset of network addresses of the set of network addresses to reserve for a sub-network connected to the remote network node, by receiving a specified size and assigning a size for the subset that is a smallest integer power of two that is greater than the specified size; and transmit a sub-network profile to the sub-network, wherein the subnetwork profile includes the subset of network addresses.

10. The system of claim 9, wherein the sub-network profile includes at least a starting address of the subset of network addresses and a number of hosts supported by the subset of network addresses.

11. The system of claim 9, wherein the remote network device is a remote access point for wirelessly connecting sub-network access points to the remote network node, and wherein the sub-network access point is a wireless access point for wirelessly connecting client devices to the sub-network.

12. The system of claim 9, further including instructions executable by the processor to:
in response to receipt of the response heartbeat message that is different from the heartbeat message;
transmit a local configuration request using the secure communication channel, wherein the local configuration request includes a request for updated network configuration information for the remote network node; and
receive a local configuration response using the secure communication channel, wherein the local configuration response includes an updated network configuration for the remote network node.

13. The system of claim 9, wherein the instructions to dynamically allocate network addresses from the set of network addresses include instructions to dynamically allocate the network addresses when the remote node controller at the central network node is unreachable from the remote network node.

14. The system of claim 9, further comprising instructions executable by the processor to:
route network traffic between the remote network node and the central network node through the secure communication channel, wherein the secure communication channel facilitates creation of a Layer-2 network that extends across the remote network node and the central network node.

15. The system of claim 9, wherein the secure communication channel is a generic routing encapsulation tunnel or an Internet Protocol Security (IPSec) connection.

16. The system of claim 9, wherein the instructions to determine the subset of network addresses includes instructions executable by the processor to:
receive an identifier and a size of the subset; and
generate a subnet mask using the identifier and the size.

17. A non-transitory computer readable medium comprising instructions executable by a processor to:
establish a secure communication channel to transmit a heartbeat message between a remote network device connected to a remote network node and a remote node controller over a public network, using a network address for the remote node controller;
receive, from the remote network node, the heartbeat message;
transmit, using the secure communication channel, a response heartbeat message to a plurality of remote network nodes, wherein:
the response heartbeat message is the same as the heartbeat message; and
the response heartbeat message to the remote network node indicates that the remote node controller has exceeded its capacity to update a network configuration for the plurality of remote network nodes; and
the response heartbeat message includes a masked heartbeat message to a second remote network node among the plurality of remote network nodes, based on the exceeded capacity of the remote node controller;
receive a first network configuration for a first remote network node among the plurality of remote network nodes over the secure communication channel when the remote node controller has the capacity to update the network configuration, wherein the first network configuration includes a network address allocation for the remote network device and a set of network addresses for dynamically allocating to devices connected to the first remote network node, wherein the set of network addresses correspond to routable addresses for a central network node, wherein the first network configuration facilitates continued functioning of the first remote network node when the remote node controller at the central network node is unreachable from the first remote network node; and
dynamically allocate network addresses from the set of network addresses when the remote node controller at the central network node is unreachable from the first remote network node.

18. The non-transitory computer readable medium of claim 17, further comprising instructions that are executed by one or more processors to perform operations including to:
in response to receipt of the response heartbeat message that is different from the heartbeat message:
transmit a local configuration request using the secure communication channel, wherein the local configuration request includes a request for updated network configuration information for the remote network node; and
receive a local configuration response using the secure communication channel, wherein the local configuration response includes an updated network configuration for the first remote network node.

19. The non-transitory computer readable medium of claim 17, wherein network addresses from the set of network addresses continue to be dynamically allocated when the remote node controller at the central network node is unreachable from the first remote network node.

20. The non-transitory computer readable medium of claim 17, including instructions executable by the processor to:
receive, at the second remote network node, a response from the remote node controller to indicate that the remote node controller has capacity to update the plurality of remote network nodes.

* * * * *